Figure 1:
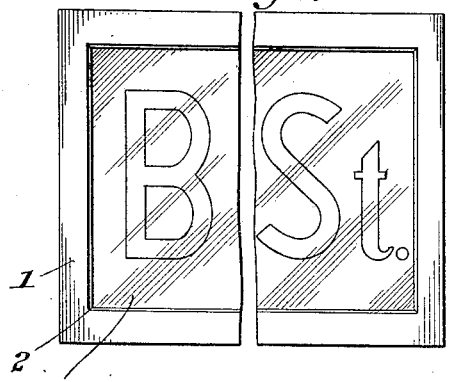
Figure 2:
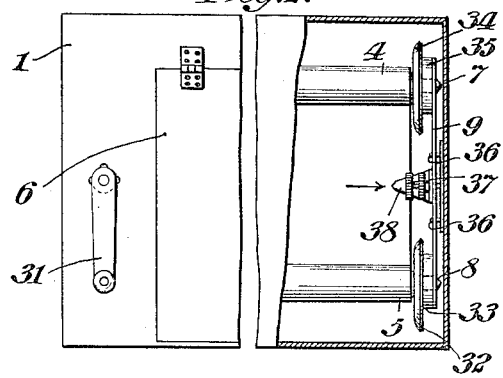
Figure 3:
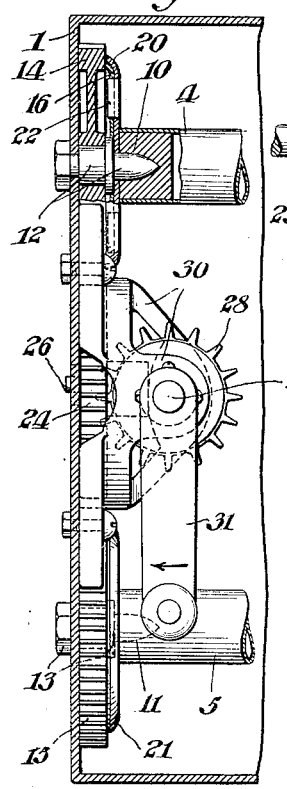
Figure 5:
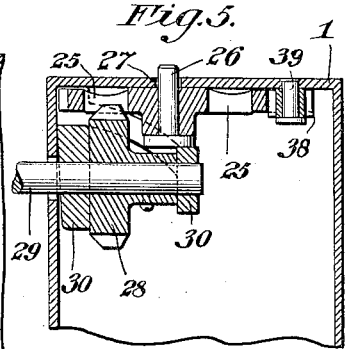
Figure 4:
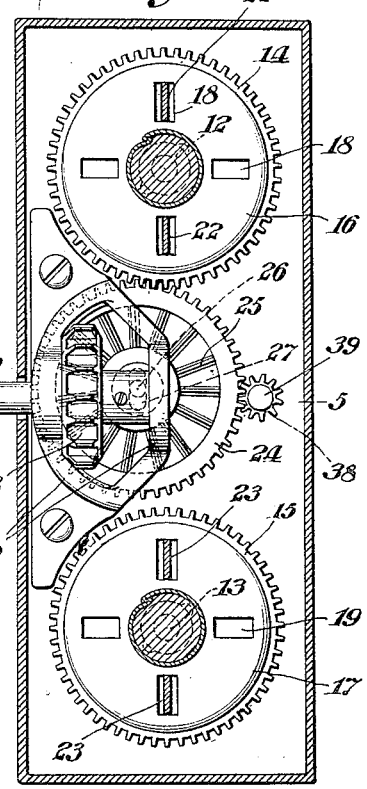
Figure 6:
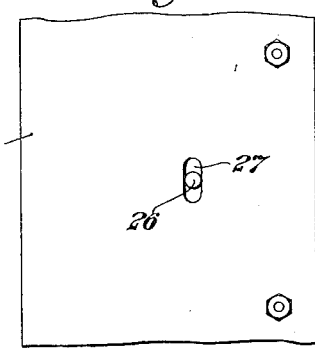

3. An amusement apparatus including a wheeled truck, a vertical standard carried by the truck, a passenger carrying member composed of two sections, one of which sections is adapted to be rotated from the motor of the truck, and coöperable means carried by both sections whereby the remaining section is rotated at a greater speed from the motor driven section.

4. An amusement apparatus, including a wheeled truck, a motor carried thereby, a vertical standard carried by the truck, a tubular member mounted upon the vertical standard, said vertical standard forming the axis therefor, a casing carried by and rotatable with the standard, means for operably connecting the standard to the motor for rotation thereby, and a canopy for the casing rotatably mounted upon the standard and independently rotatable from the casing.

5. An amusement apparatus, including a wheeled truck, a motor carried thereby, a vertical standard carried by the truck, a tubular member mounted upon the vertical standard, said vertical standard forming the axis therefor, a casing carried by and rotatable with the standard, means for operably connecting the standard to the motor for rotation thereby, a canopy for the casing rotatably mounted upon the standard and independently rotatable from the casing, and coöperable means carried by the main casing and the canopy.

6. In an amusement device, the combination with a tunnel, having a slot leading thereto, of a motor driven vehicle movable through the tunnel, a motor carried by the vehicle, a vertical standard carried by the vehicle and extending through the slot, a tube rotatably mounted upon the standard and also extending through the slot, antifrictional means carried by the tube for holding the same out of contact with the walls of the slot, means for connecting the motor to the sleeve for rotating the sleeve, and a passenger carrying member bodily carried by and rotatable with the sleeve.

7. In an amusement device, the combination with a tunnel, having a slot leading thereto, of a motor driven vehicle movable through the tunnel, a motor carried by the vehicle, a vertical standard carried by the vehicle and extending through the slot, a tube rotatably mounted upon the standard and also extending through the slot, antifrictional means carried by the tube for holding the same out of contact with the walls of the slot, means for connecting the motor to the sleeve for rotating the sleeve, a passenger carrying member bodily carried by and rotatable with the sleeve, a canopy for the carrying member mounted for independent rotation, and coöperable means carried by the canopy and the carrying member whereby the canopy is rotated through the carrying member.

In testimony that I claim the foregoing as my own, I have hereto affixed my signature in the presence of two witnesses.

LEOPOLD DREIFUSS.

Witnesses:
LAURA B. ANDERSON,
E. P. ANTONOVICH.

C. P. EBERSOLE.
CHANGEABLE SIGN.
APPLICATION FILED DEC. 14, 1912.

1,133,624.

Patented Mar. 30, 1915.

WITNESSES:

INVENTOR
Cyrus P. Ebersole,
BY
Charles N. Butler
ATTORNEY.